(12) United States Patent
Warren et al.

(10) Patent No.: US 10,612,413 B2
(45) Date of Patent: Apr. 7, 2020

(54) WEAR INDICATOR FOR DETERMINING WEAR ON A COMPONENT OF A GAS TURBINE ENGINE

(71) Applicant: United Technologies Corporation, Farmington, CT (US)

(72) Inventors: Eli Cole Warren, Wethersfield, CT (US); Darren M. Wind, Glastonbury, CT (US); Ian Alexander Fielder Agoos, Boston, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/450,939

(22) Filed: Mar. 6, 2017

(65) Prior Publication Data

US 2018/0252117 A1    Sep. 6, 2018

(51) Int. Cl.

| | |
|---|---|
| *G01M 15/14* | (2006.01) |
| *F01D 21/00* | (2006.01) |
| *G01B 21/16* | (2006.01) |
| *F01D 11/02* | (2006.01) |
| *F01D 17/02* | (2006.01) |
| *F01D 11/12* | (2006.01) |

(52) U.S. Cl.
CPC .......... *F01D 21/003* (2013.01); *F01D 11/025* (2013.01); *F01D 11/12* (2013.01); *F01D 17/02* (2013.01); *G01B 21/16* (2013.01); *F05D 2250/232* (2013.01); *F05D 2260/80* (2013.01)

(58) Field of Classification Search
CPC ........ F01D 11/006; F01D 11/08; F01D 11/12; F01D 11/122; G01M 15/14

USPC ........................................................ 73/112.01
See application file for complete search history.

(56) References Cited

U.S. PATENT DOCUMENTS

| | | | | |
|---|---|---|---|---|
| 5,823,739 | A * | 10/1998 | Van Duyn | F01D 21/045 415/9 |
| 6,059,524 | A * | 5/2000 | Costa | F01D 21/045 415/200 |
| 6,179,551 | B1* | 1/2001 | Sathianathan | F01D 21/045 415/173.4 |
| 6,227,794 | B1* | 5/2001 | Wojtyczka | F01D 11/122 415/173.4 |

(Continued)

FOREIGN PATENT DOCUMENTS

| | | |
|---|---|---|
| DE | 102015224454 A1 | 6/2017 |
| WO | 2012162016 A1 | 11/2012 |

OTHER PUBLICATIONS

Extended European Search Report for Application No. 18160341.6-1006; Report dated Jul. 23, 2018; 9 pages.

*Primary Examiner* — Eric S. McCall
(74) *Attorney, Agent, or Firm* — Cantor Colburn LLP (57) ABSTRACT

In combination a wear indicator and a component of a gas turbine engine is provided. The wear indicator is secured to a surface of the component of the gas turbine engine. The wear indicator comprising: a first side delaminates when impacted by a blade of the gas turbine engine; a second side parallel to the first side, the second side being secured to a surface of the component of the gas turbine engine; a mid-section interposed between the first side and the second side; and a reference dimension remains constant when the first side delaminates.

25 Claims, 6 Drawing Sheets

(56) References Cited

U.S. PATENT DOCUMENTS

| | | | | |
|---|---|---|---|---|
| 7,409,319 B2* | 8/2008 | Kant | ............... | F01D 21/003 |
| | | | | 702/188 |
| 7,975,354 B2* | 7/2011 | Greenberg | ............ | B23P 15/006 |
| | | | | 29/23.51 |
| 8,942,886 B2* | 1/2015 | Tourin | ................ | F01D 21/003 |
| | | | | 123/21 |
| 9,068,906 B2* | 6/2015 | Silieti | ................ | G01M 15/02 |
| 9,316,479 B2* | 4/2016 | Warren | ................ | G01B 7/22 |
| 10,077,992 B2* | 9/2018 | Warren | ................ | G01D 11/16 |
| 2011/0192212 A1* | 8/2011 | Delprat | ................ | F03D 17/00 |
| | | | | 73/12.01 |
| 2012/0207586 A1 | 8/2012 | Chehab et al. | | |
| 2013/0084163 A1 | 4/2013 | Wiebe | | |
| 2014/0020485 A1* | 1/2014 | Tran | ................ | F01D 21/003 |
| | | | | 73/865.8 |
| 2014/0064924 A1* | 3/2014 | Warren | ................ | G01B 7/14 |
| | | | | 415/118 |
| 2015/0090017 A1* | 4/2015 | Silieti | ................ | G01M 15/02 |
| | | | | 73/112.01 |
| 2015/0252686 A1 | 9/2015 | Wasserman et al. | | |
| 2016/0061050 A1* | 3/2016 | Keenan | ................ | F01D 11/122 |
| | | | | 415/118 |
| 2017/0343334 A1 | 11/2017 | Whitlock et al. | | |
| 2018/0216481 A1* | 8/2018 | Sippel | ................ | F01D 11/122 |
| 2019/0040759 A1* | 2/2019 | Warren | ................ | F01D 11/08 |

* cited by examiner

WEAR INDICATOR FOR DETERMINING WEAR ON A COMPONENT OF A GAS TURBINE ENGINE

BACKGROUND

The subject matter disclosed herein generally relates to gas turbine engines and, more particularly, to a method and an apparatus for detecting blade tip clearance for a gas turbine engine.

Gas turbine engines are used in numerous applications, one of which is for providing thrust to an airplane. Gas turbines comprise a number of blades in different sections that rotate in order to generate thrust. In order to improve performance, designers have reduced the clearance between blades and inner surfaces of the gas turbine engine. This reduced clearance leads to less room for blade rotation and thus the blade clearance must be accurately monitored.

SUMMARY

According to one embodiment, in combination a wear indicator and a component of a gas turbine engine is provided. The wear indicator is secured to a surface of the component of the gas turbine engine. The wear indicator comprising: a first side delaminates when impacted by a blade of the gas turbine engine; a second side parallel to the first side, the second side being secured to a surface of the component of the gas turbine engine; a mid-section interposed between the first side and the second side; and a reference dimension remains constant when the first side delaminates.

In addition to one or more of the features described above, or as an alternative, further embodiments of the combination of the wear indicator and the component of the gas turbine engine may include where the reference dimension remains constant throughout the midsection from the first side to the second side.

In addition to one or more of the features described above, or as an alternative, further embodiments of the combination of the wear indicator and the component of the gas turbine engine may include where the wear indicator further comprises an orifice initiating at the first side and extending through the midsection to the second side.

In addition to one or more of the features described above, or as an alternative, further embodiments of the combination of the wear indicator and the component of the gas turbine engine may include where the first side has a first surface area and the second side has a second surface area larger than the first surface area.

In addition to one or more of the features described above, or as an alternative, further embodiments of the combination of the wear indicator and the component of the gas turbine engine may include where the wear indicator has a conical frustum shape.

In addition to one or more of the features described above, or as an alternative, further embodiments of the combination of the wear indicator and the component of the gas turbine engine may include where the midsection includes one outer surface between the first side and the second side.

In addition to one or more of the features described above, or as an alternative, further embodiments of the combination of the wear indicator and the component of the gas turbine engine may include where the midsection includes at least one outer surface between the first side and the second side; and the at least one outer surface includes an inscribed measurement scale.

In addition to one or more of the features described above, or as an alternative, further embodiments of the combination of the wear indicator and the component of the gas turbine engine may include where the orifice has a circular shape.

In addition to one or more of the features described above, or as an alternative, further embodiments of the combination of the wear indicator and the component of the gas turbine engine may include where the at least one selected reference dimension includes a diameter of the orifice.

In addition to one or more of the features described above, or as an alternative, further embodiments of the combination of the wear indicator and the component of the gas turbine engine may include where the orifice is perpendicular to the first side and the second side.

In addition to one or more of the features described above, or as an alternative, further embodiments of the combination of the wear indicator and the component of the gas turbine engine may include where the at least one reference dimension includes an outer diameter of the second side.

In addition to one or more of the features described above, or as an alternative, further embodiments of the combination of the wear indicator and the component of the gas turbine engine may include where the orifice includes an inner diameter that varies in size from the first side to the second side.

In addition to one or more of the features described above, or as an alternative, further embodiments of the combination of the wear indicator and the component of the gas turbine engine may include where the inner diameter at the first side is greater in size than the inner diameter at the second side.

In addition to one or more of the features described above, or as an alternative, further embodiments of the combination of the wear indicator and the component of the gas turbine engine may include where the inner diameter at the second side is greater in size than the inner diameter at the first side.

In addition to one or more of the features described above, or as an alternative, further embodiments of the combination of the wear indicator and the component of the gas turbine engine may include where the wear indicator includes a plurality of blind holes originating from the second side and each terminating within the midsection.

In addition to one or more of the features described above, or as an alternative, further embodiments of the combination of the wear indicator and the component of the gas turbine engine may include where each blind hole terminates at a different depth dimension within the midsection.

According to another embodiment, a method of detecting blade clearance in a gas turbine engine is provided. The method comprising: attaching one or more wear indicators to an inner surface of a gas turbine engine opposite a blade of the gas turbine engine; capturing a baseline set of measurements of each wear indicator; operating the gas turbine engine at a first selected speed for a first period of time; shutting down the gas turbine engine to allow for cooling when the first period of time has ended; and capturing a first set of measurements of each wear indicator.

In addition to one or more of the features described above, or as an alternative, further embodiments of the method may include operating the gas turbine engine at a second selected speed for a second period of time; shutting down the gas turbine engine to allow for cooling when the second period of time has ended; and capturing a second set of measurements of each wear indicator.

In addition to one or more of the features described above, or as an alternative, further embodiments of the combination of the wear indicator and the component of the gas turbine engine may include where capturing a first set of measurements of each wear indicator includes capturing photographs of each wear indicator.

In addition to one or more of the features described above, or as an alternative, further embodiments of the combination of the wear indicator and the component of the gas turbine engine may include inscribing a measurement scale on the wear indicator prior to attaching each wear indicator to the inner surface of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
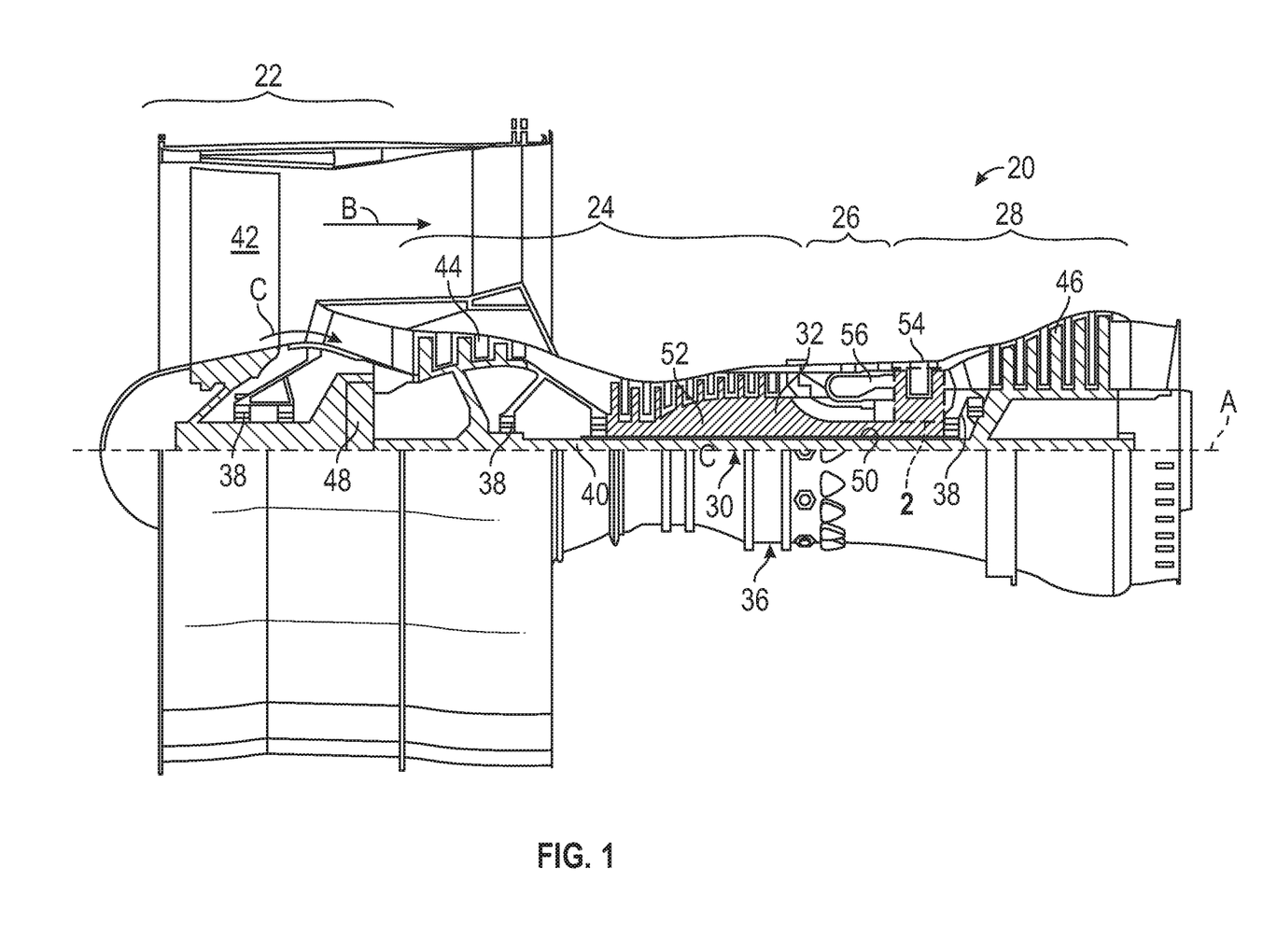
FIG. 1 is a cross-sectional illustration of an aircraft engine, in accordance with an embodiment of the disclosure

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
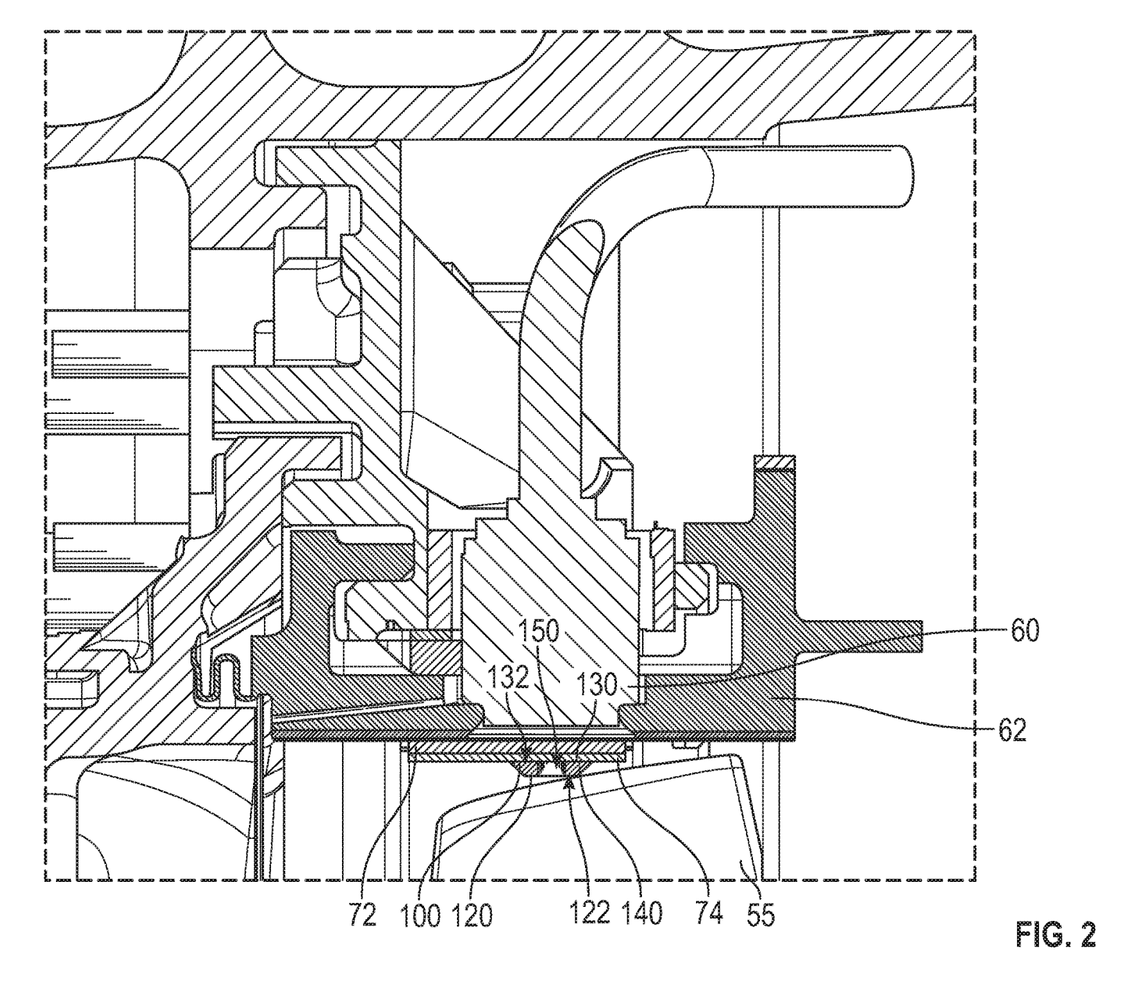
FIG. 2 is a schematic cross-sectional illustration of a wear indicator attached to the inner surface of a gas turbine engine, in accordance with an embodiment of the disclosure.

Referring now to FIG. 2, which shows a cross-sectional view of a rub button or wear indicator 100 installed in a gas turbine engine 20, in accordance with an embodiment of the disclosure. As seen in FIG. 2, the wear indicator 100 is attached to an inner surface 72 of the gas turbine engine 20 opposite a blade 55 of the gas turbine engine 20. One or more wear indicators 100 may be affixed to the inner surface 72 of the gas turbine engine 20 in order to monitor the clearance between the blade 55 and the inner surface 72, a method discussed further below in FIG. 7. In the embodiment of FIG. 2, the wear indicator 100 has been installed in the high pressure turbine 54 of the gas turbine engine 20. An abradable coating 74 may be applied on the inner surface 72 of the gas turbine engine 20 and the wear indicator 100 may be attached to the abradable coating 74 on the inner surface 72. The abradable coating 74 is designed to provide protection for the inner surface 72 against a blade 55 strike. If a blade 55 were to extend towards the inner surface 72 then the abradable coating 74 shall be struck first and absorb the impact of the blade 55 to prevent damage to the inner surface 72. The wear indicator 100 may be attached to the inner surface 72 using an adhesive (not shown) that may or may not need a curing to adhere the wear indicator 100 to the inner surface 72. The wear indicator 100 may be affixed to the inner surface 72 proximate a blade monitoring probe 60. The blade monitoring probe 60 may be configured to measure various performance parameters of the blade 55 including but not limited to blade timing and blade clearance. The blade monitoring probe 60 may capture these various performance parameters wirelessly. Data captured using the wear indicator 100 may then later be compared to data captured by the blade monitoring probe 60 in order to adjust the operation of the blade monitoring probe 60 to improve the performance of the blade monitoring probe 60. In one example, the blade monitoring probe 60 may be a Pentair CapaciSense system. The blade monitoring probe 60 may be secured in place by a blade outer air seal 62.

As seen in FIG. 2, the wear indicator 100 may comprise a first side 120 having a first surface area 122 and a second side 130 parallel to the first side 120. The second side 130 has a second surface area 132. The wear indicator 100 also comprises a mid-section 140 interposed between the first side 120 and the second side 130. In an embodiment, the second surface area 132 may be larger than the first surface area 122. The second side of the wear indicator 100 is affixed to the inner surface 72 of the gas turbine engine 20. If the blade 55 strikes the wear indicator 100 then a layer of the wear indicator 100 will be removed from the first side 120. Thus, the first side 120 delaminates when impacted by a blade 55 of the gas turbine engine 20. Delaminate may be understood to mean the removal of material from the wear indicator 100 in layers 170. The wear indicator 100 further comprises an orifice 150 initiating at the first side 120 and extending through a midsection 140 to the second side 130. In an embodiment, the mid-section 140 includes at least one reference dimension. The reference dimension may be a single dimension on the wear indicator 100, such as for example an inner diameter (e.g. ID1) of the wear indicator 100, an outer diameter (e.g. OD3) of the wear indicator 100, or an angle α of the wear indicator 100. The wear indicator 100 may remain constant throughout the midsection 140 from the first side 120 to the second side 130. In an embodiment, the orifice 150 may have a circular shape. In another embodiment, the orifice 150 includes at least one reference dimension that remains constant throughout the orifice 150 from the first side 120 to the second side 130. For example, the inner diameter ID1 (see FIGS. 4-6) of the orifice 150 may serve as the reference dimension. Thus, as the blade 55 removes layers of the first side 120, the inner diameter ID1 of the orifice 150 may serve as a reference dimension for detecting how much of the wear indicator 100 was removed, which is discussed further below. In another example, the reference dimension may also be a third outer diameter OD3 on the second side 130. As the blade 55 removes layers of the first side 120, the third outer diameter OD3 will stay the same and may serve as a reference dimension for detecting how much of the wear indicator 100 was removed. As may be appreciated by one of skill in the art, the wear indicator 100 may include various shapes, sizes and reference dimensions not disclosed herein.

Figure 3:
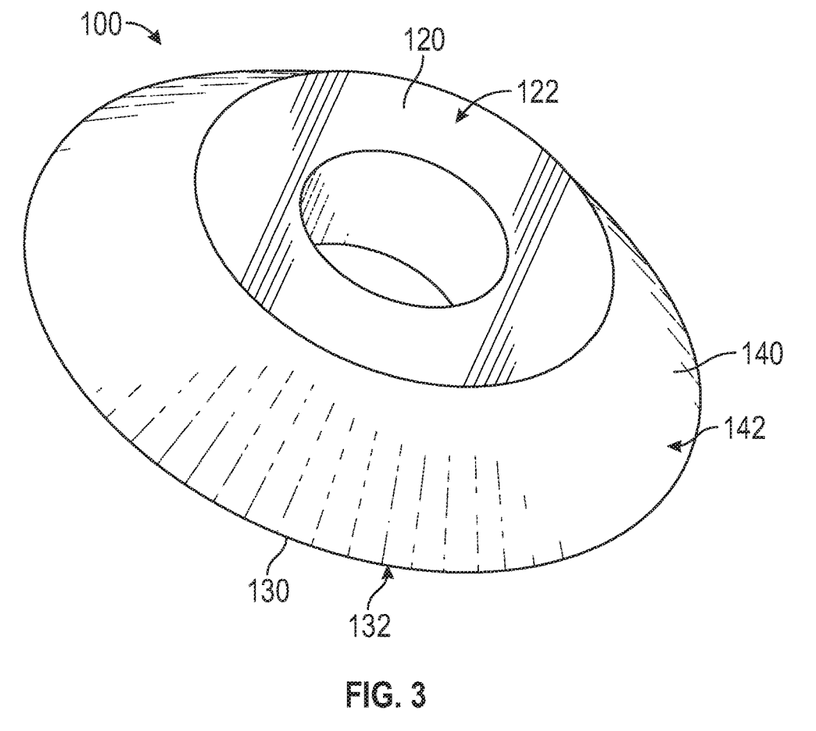
FIG. 3 is a schematic isometric illustration of the wear indicator of FIG. 2, in accordance with an embodiment of the disclosure.

Referring now to FIG. 3, which shows an isometric view of the wear indicator 100. The wear indicator 100 may have various shapes. In the illustrated embodiment of FIG. 3, the first side 120 and the second side 130 are both round in shape, which creates one outer surface 142 for the midsection 140 and a conical frustum shape for the wear indicator 100. If the first side 120 and second side 130 had different shapes then the midsection 140 would have more outer surfaces 142. For example, if the first side 130 and second side 130 were both square then the midsection 140 would have four outer surfaces 142. In an embodiment, the midsection 140 has one outer surface 142. In another embodiment, the wear indicator 100 has a conical frustum shape, as seen in FIG. 3.

Figure 4:
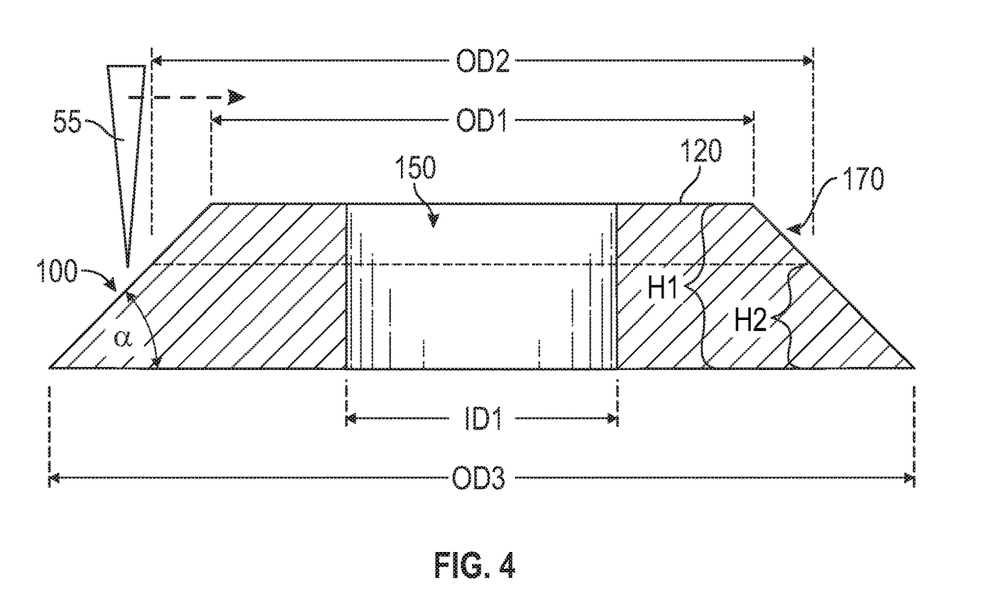
FIG. 4 is a schematic cross-sectional illustration of the wear indicator of FIG. 2, in accordance with an embodiment of the disclosure.
Figure 5:
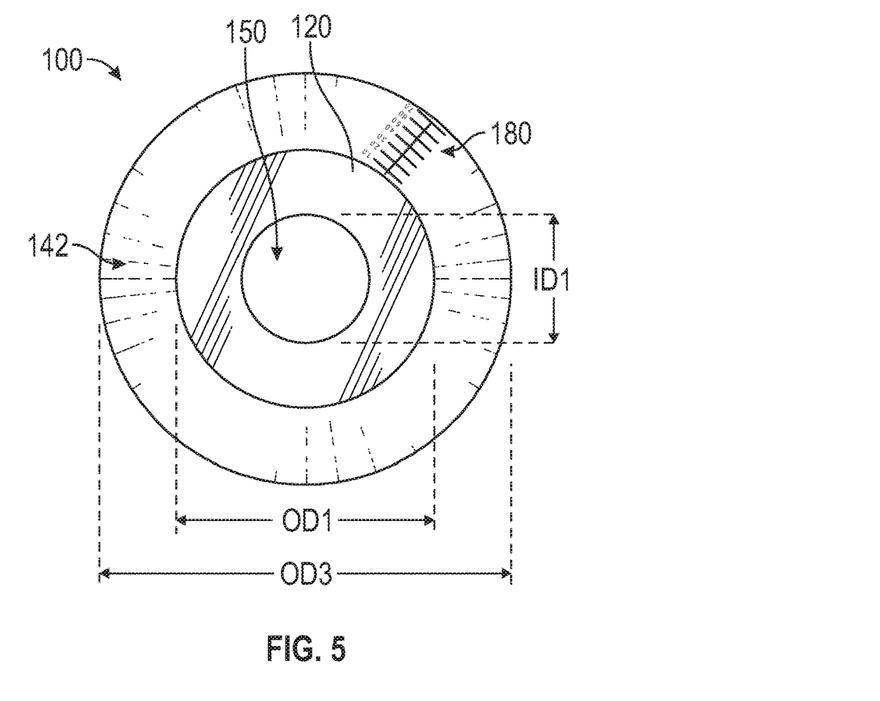
FIG. 5 is a schematic illustration of a first side of a wear indicator of FIG. 2 prior to material removal, in accordance with an embodiment of the disclosure.
Figure 6:
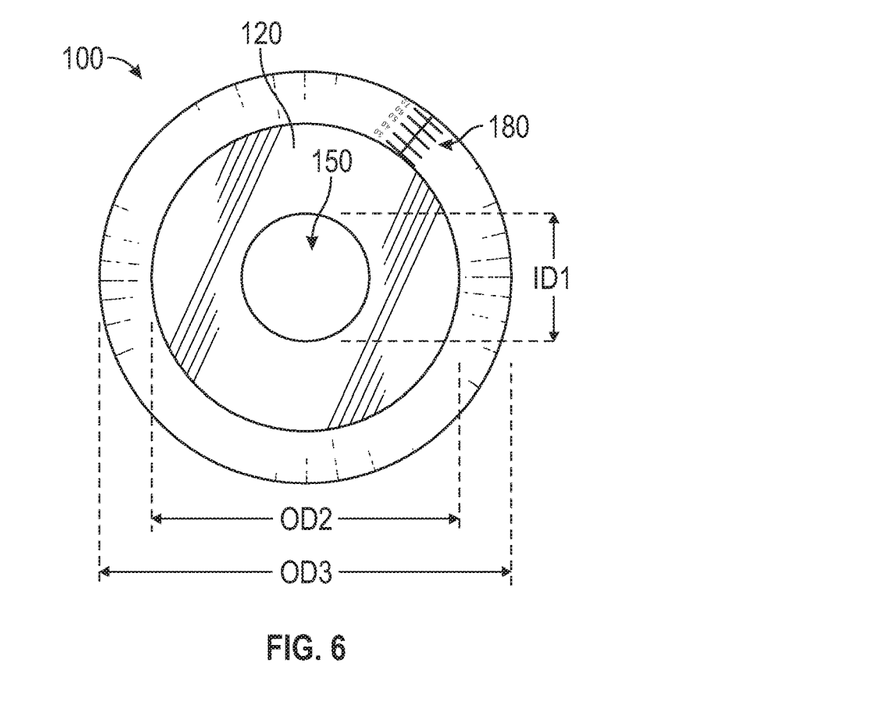
FIG. 6 is a schematic illustration of a first side of a wear indicator of FIG. 2 post material removal, in accordance with an embodiment of the disclosure.

Referring now to FIGS. 4-6 while continuing to reference FIGS. 1-3. FIGS. 4-6 in an example show the removal of a layer 170 of material from the wear indicator 100. As the mentioned above, the wear indicator 100 is utilized to measure the clearance between blades 55 and the inner surface 72. Various amounts of material may be removed from the wear indicator 100 based upon the various operating parameters of the gas turbine engine 20, such as for example, engine speed, operation duration, and engine internal temperature. FIG. 5 shows a view of the first side 120 prior to any material removal and FIG. 6 shows a view of the first side 120 after material removal by the blade 55. Prior to material removal, the first side 120 has a first outer diameter OD1 and the second side 130 has a third outer diameter OD3. As the blade 55 removes a layer 170 of material, the height of the wear indicator 100 is reduced from a first height H1 to a second height H2, which expands the outer diameter of the first side 120 from the first outer diameter OD1 to the second outer diameter OD2. Before and after the material removal, the inner diameter ID1 of the orifice 150 remains unchanged and thus may be used as a reference measurement. For instance, an image may be taken of the first side 120 prior to material removal (FIG. 5) and after material (FIG. 6). In an example, the image may be taken by borescope. Then the images may be compared to each other to determine the amount of material removed. In an example, the inner diameter ID1 remains unchanged after material is removed, thus an image of the first side 120 after material removal (FIG. 6) may be analyzed to determine the second outer diameter OD2 using the inner diameter ID1 as a reference. Once the second outer diameter OD2 is determined then the height (H1-H2) of the layer 170 removed may be determined using equations and other known values, such as, for example the angle α between the second side 130 and the outer surface 142 of the midsection 140, the initial height H1 of the wear indicator 100, and the third outer diameter OD3. For instance, the following equation may be used.

$$(H1 - H2) = H1 - \frac{(OD3 - OD2)}{2}\tan\alpha$$

The angle α may be considered a reference dimension. In order to help determine how much material was removed when the layer 170 is taken off by the blade 55, the outer surface 142 may also include an inscribed measurement scale 180 as seen in FIGS. 5 and 6. For instance, the measurement scale may be a series of numbers and/or shading to help gage how much material has been removed.

Figure 7A:
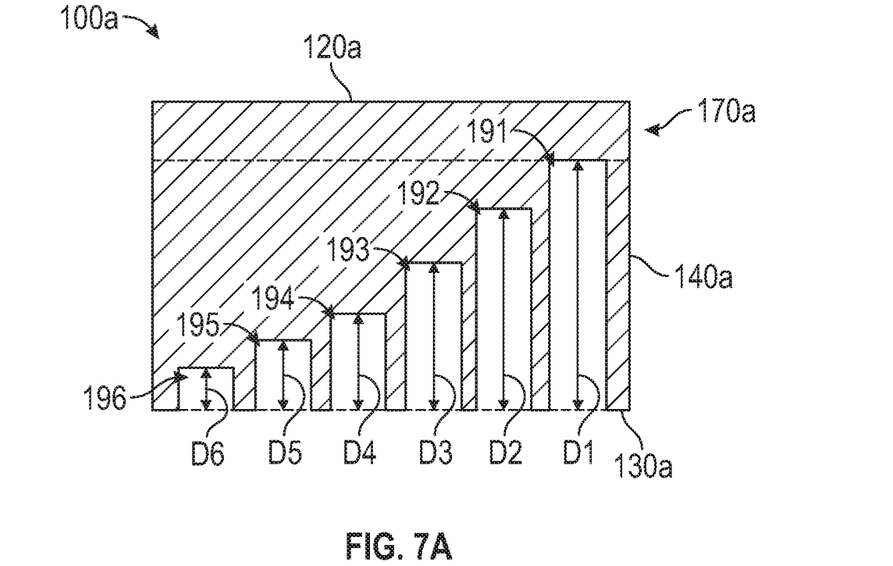
FIG. 7a is a schematic cross-sectional illustration of the wear indicator, in accordance with an embodiment of the disclosure.
Figure 7B:
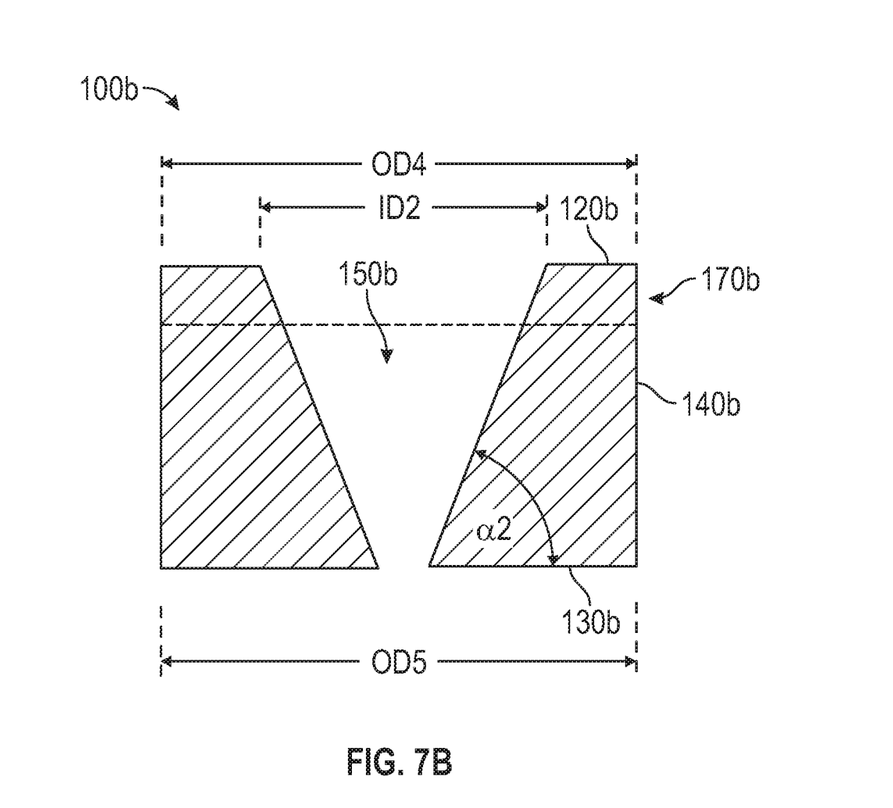
FIG. 7b is a schematic cross-sectional illustration of the wear indicator, in accordance with an embodiment of the disclosure.

FIGS. 7a and 7b show different possible configurations for the wear indicators 100a-b. As seen in FIG. 7a, the wear indicator 100a may be composed of a first side 120a, a second side 130a parallel to the first side 120 and a mid-section 140a interposed between the first side 120a and the second side 130a. The wear indicator 100a may include a plurality of blind holes 191-196 originating from the second side 130a and each terminating within the midsection 140a. Each of the blind holes 191-196 has depth dimension D1-D6 and each depth dimension D1-D6 may be different. In an embodiment, each blind hole 191-196 may terminate at a different depth dimension D1-D6 within the midsection 140a. As layers 170a delaminate from the first side 120a, when a blade strikes, different blind holes 191-196 may be exposed indicating the depth of the blade strike. The depth dimension D1-D6 of each blind hole 191-196 may be known and thus serve as reference dimensions.

As seen in FIG. 7b, the wear indicator 100b may be composed of a first side 120b, a second side 130b parallel to the first side 120b and a mid-section 140b interposed between the first side 120b and the second side 130b. The wear indicator 100b may include an orifice 150b initiating at the first side 120b and extending through the midsection 140b to the second side 130b. The orifice 150b may circular and may include an internal diameter ID2 that varies in size from the first side 120b to the second side 130b. The angle α2 that the inner diameter ID2 changes may be known and thus the amount of material removed from first side 120b may be determined similar to the method above in reference to FIGS. 4-6. The angle α2 may be considered a reference dimension. A fifth outer diameter OD5 of the second side 130b may serve as a reference dimension as layers 170b are removed (delaminated) by a blade from the first side 120b. A fourth outer diameter OD4 of the first side 120b may also serve as a reference dimension as layers 170b are removed by a blade from the first side 120b.

Figure 8:
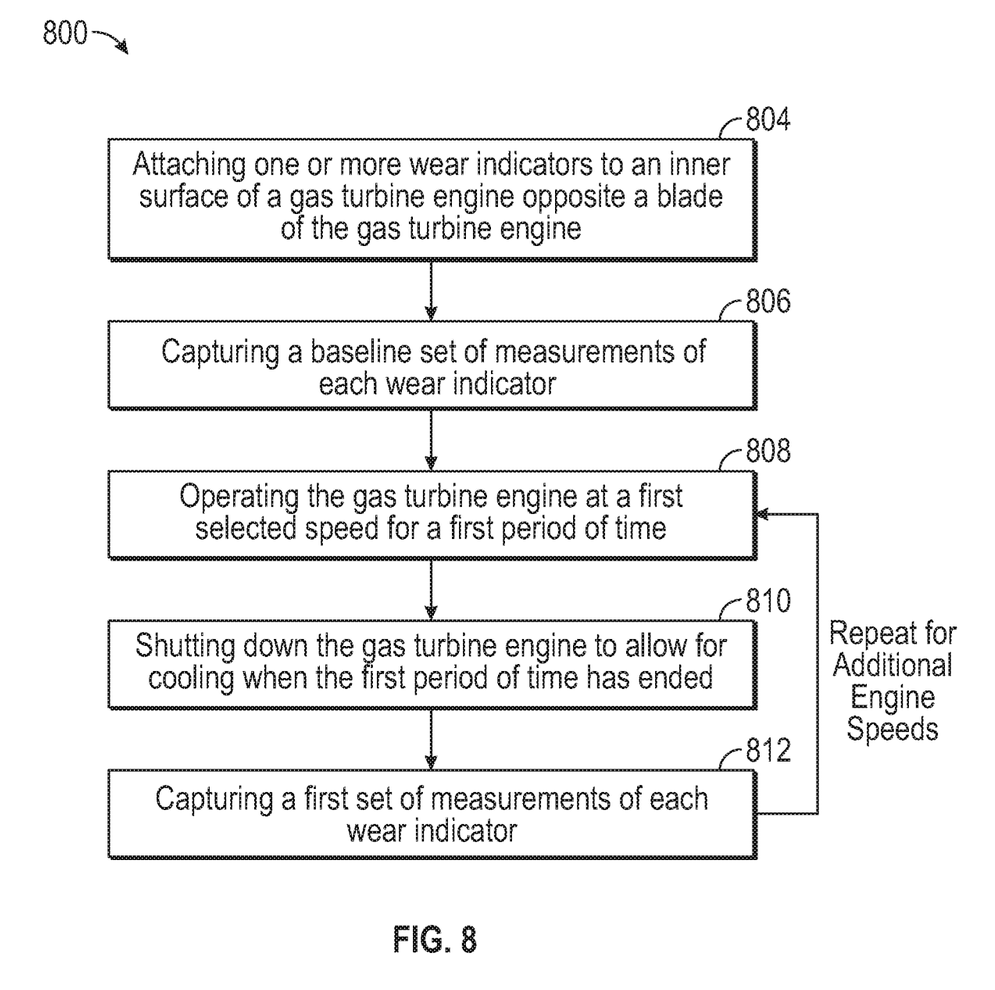
FIG. 8 is a flow process illustrating a method of detecting blade clearance within a gas turbine engine, in accordance with an embodiment of the disclosure.

FIG. 8 is a flow chart illustrating a method 800 for detecting blade clearance in a gas turbine engine, in accordance with an embodiment. The method 800 of FIG. 8 is described in reference to FIGS. 1-7 and may be performed with an alternate order and include additional steps. At block 804, one or more wear indicators 100 are attached to an inner surface 72 of a gas turbine engine 20 opposite a blade 55 of the gas turbine engine 20. As mentioned above, the wear indicators 100 may be attached using an adhesive that may require a curing step. Following the use of the adhesive, excessive adhesive may need to be removed from the orifice 150 in the wear indicator 100 to ensure proper reference dimensions. The method 800 may also include inscribing a measurement scale 180 on the wear indicator 100 prior to attaching the wear indicator 100 to the inner surface 72. At block 806, a baseline set of measurements of each wear indicator is captured. Thus, initial dimensions of each wear indicator 100 are captured before any material removal. A coordinate measuring machine (CMM) may be used to capture the baseline set of measurements. Additionally, a borescope may be used to take photos and capture the baseline set of measurements. At block 808, the gas turbine engine 20 is operated at a first selected speed for a first period of time. While the engine 20 is operating, a blade monitoring probe 60 may also capture a first set of data during the first time period. The first set of data may include blade clearance measurements. At block 810, the gas turbine engine 20 is shut down to allow for cooling when the first period of time has ended. At block 812, a first set of measurements of each wear indicator 100 is captured. A coordinate measuring machine (CMM) may be used to capture the first set of measurements. Additionally, a borescope may be used to take photos and capture the first set of measurements.

The amount of material removed from the wear indicator 100 may be determined in response to the baseline set of measurements and the first data set, as described above. The method 800 may be repeated for a second engine speed, a third engine speed, . . . etc. The engine speeds tested (first engine speed, second engine speed . . . etc) may represent different flight conditions experienced by the engine including but not limited to ground idle, flight idle, max cruise, take-off, max power, and any other flight condition known to one of skill in the art.

While the above description has described the flow process of FIG. 8 in a particular order, it should be appreciated that unless otherwise specifically required in the attached claims that the ordering of the steps may be varied.

Technical effects of embodiments of the present disclosure include using a wear indicator to determine blade tip clearance.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. In combination a wear indicator and a component of a gas turbine engine, wherein the wear indicator is secured to a surface of the component of the gas turbine engine, the wear indicator comprising:
a first side delaminates when impacted by a blade of the gas turbine engine;
a second side parallel to the first side, the second side being secured to a surface of the component of the gas turbine engine;
a mid-section interposed between the first side and the second side;
an orifice initiating at the first side and extending through the midsection to the second side, the orifice extending completely through the wear indicator; and
a reference dimension that remains constant when the first side delaminates, wherein the reference dimension is an inner diameter of the orifice or an outer diameter of the second side.

2. The combination of the wear indicator and the component of the gas turbine engine of claim 1, wherein the reference dimension is the inner diameter of the orifice, and wherein the reference dimension remains constant throughout the midsection from the first side to the second side.

3. The combination of the wear indicator and the component of the gas turbine engine of claim 1, wherein the midsection includes one outer surface between the first side and the second side.

4. The combination of the wear indicator and the component of the gas turbine engine of claim 1, wherein the midsection includes at least one outer surface between the first side and the second side; and the at least one outer surface includes an inscribed measurement scale.

5. The combination of the wear indicator and the component of the gas turbine engine of claim 1, wherein the orifice has a circular shape.

6. The combination of the wear indicator and the component of the gas turbine engine of claim 1, wherein the orifice is perpendicular to the first side and the second side.

7. The combination of the wear indicator and the component of the gas turbine engine of claim 1, wherein the first side has a first surface area and the second side has a second surface area larger than the first surface area.

8. The combination of the wear indicator and the component of the gas turbine engine of claim 7, wherein the wear indicator has a conical frustum shape.

9. The combination of the wear indicator and the component of the gas turbine engine of claim 1, wherein the reference dimension is the outer diameter of the second side, and wherein the orifice includes an inner diameter that varies in size from the first side to the second side.

10. The combination of the wear indicator and the component of the gas turbine engine of claim 9, wherein the inner diameter at the first side is greater in size than the inner diameter at the second side.

11. The combination of the wear indicator and the component of the gas turbine engine of claim 9, wherein the inner diameter at the second side is greater in size than the inner diameter at the first side.

12. In combination a wear indicator and a component of a gas turbine engine, wherein the wear indicator is secured to a surface of the component of the gas turbine engine, the wear indicator comprising:
a first side delaminates when impacted by a blade of the gas turbine engine;
a second side parallel to the first side, the second side being secured to a surface of the component of the gas turbine engine; and
a mid-section interposed between the first side and the second side,
wherein the midsection includes at least one outer surface between the first side and the second side, and wherein the at least one outer surface includes an inscribed measurement scale.

13. The combination of the wear indicator and the component of the gas turbine engine of claim 12, wherein the midsection includes one outer surface between the first side and the second side.

14. The combination of the wear indicator and the component of the gas turbine engine of claim 12, wherein the first side has a first surface area and the second side has a second surface area larger than the first surface area.

15. The combination of the wear indicator and the component of the gas turbine engine of claim 14, wherein the wear indicator has a conical frustum shape.

16. The combination of the wear indicator and the component of the gas turbine engine of claim 12, wherein the wear indicator further comprises an orifice initiating at the first side and extending through the midsection to the second side.

17. The combination of the wear indicator and the component of the gas turbine engine of claim 16, wherein the orifice has a circular shape.

18. The combination of the wear indicator and the component of the gas turbine engine of claim 16, wherein the orifice is perpendicular to the first side and the second side.

19. The combination of the wear indicator and the component of the gas turbine engine of claim 16, further comprising:
a reference dimension that remains constant when the first side delaminates, wherein the reference dimension is an inner diameter of the orifice or an outer diameter of the second side.

20. The combination of the wear indicator and the component of the gas turbine engine of claim 19, wherein the reference dimension is the inner diameter of the orifice, and wherein the reference dimension remains constant throughout the midsection from the first side to the second side.

21. The combination of the wear indicator and the component of the gas turbine engine of claim 19, wherein the reference dimension is the outer diameter of the second side, and wherein the orifice includes an inner diameter that varies in size from the first side to the second side.

22. The combination of the wear indicator and the component of the gas turbine engine of claim 21, wherein the inner diameter at the first side is greater in size than the inner diameter at the second side.

23. The combination of the wear indicator and the component of the gas turbine engine of claim 21, wherein the inner diameter at the second side is greater in size than the inner diameter at the first side.

24. In combination a wear indicator and a component of a gas turbine engine, wherein the wear indicator is secured to a surface of the component of the gas turbine engine, the wear indicator comprising:
- a first side delaminates when impacted by a blade of the gas turbine engine;
- a second side parallel to the first side, the second side being secured to a surface of the component of the gas turbine engine; and
- a mid-section interposed between the first side and the second side,
- wherein the wear indicator includes a plurality of blind holes originating from the second side and each terminating within the midsection.

25. The combination of the wear indicator and the component of the gas turbine engine of claim 24, wherein each blind hole terminates at a different depth dimension within the midsection.

* * * * *